(12) United States Patent
Canessa et al.

(10) Patent No.: US 8,788,519 B2
(45) Date of Patent: Jul. 22, 2014

(54) SYSTEM AND METHODS FOR METADATA MANAGEMENT IN CONTENT ADDRESSABLE STORAGE

(76) Inventors: John C. Canessa, Apple Valley, MN (US); Giancarlo Canessa, Rosemount, MN (US); Gino G. Canessa, Brookville, IN (US)

(*) Notice: Subject to any disclaimer, the term of this patent is extended or adjusted under 35 U.S.C. 154(b) by 274 days.

(21) Appl. No.: 12/605,036

(22) Filed: Oct. 23, 2009

(65) Prior Publication Data

US 2010/0138446 A1 Jun. 3, 2010

Related U.S. Application Data

(60) Provisional application No. 61/108,341, filed on Oct. 24, 2008.

(51) Int. Cl.
*G06F 17/30* (2006.01)

(52) U.S. Cl.
USPC ............................ 707/769; 707/722; 707/770

(58) Field of Classification Search
USPC .......................................... 707/770, 769, 722
See application file for complete search history.

(56) References Cited

U.S. PATENT DOCUMENTS

| | | | |
|---|---|---|---|
| 4,149,239 A | 4/1979 | Jenkins et al. | |
| 4,386,233 A | 5/1983 | Smid et al. | |
| 4,491,725 A | 1/1985 | Pritchard | |
| 4,852,570 A | 8/1989 | Levine | |
| 4,860,112 A | 8/1989 | Nichols | |
| 4,874,935 A | 10/1989 | Younger | |
| 4,945,410 A | 7/1990 | Walling | |
| 4,958,283 A | 9/1990 | Tawara et al. | |
| 5,002,062 A | 3/1991 | Suzuki | |
| 5,005,126 A | 4/1991 | Haskin | |
| 5,019,975 A | 5/1991 | Mukai | |
| 5,208,802 A | 5/1993 | Suzuki | |
| 5,235,510 A | 8/1993 | Yamada et al. | |
| 5,272,625 A | 12/1993 | Nishihara et al. | |
| 5,291,399 A | 3/1994 | Chaco | |
| 5,319,543 A | 6/1994 | Wilhelm | |

(Continued)

FOREIGN PATENT DOCUMENTS

| | | |
|---|---|---|
| DE | 19802572 | 5/1999 |
| EP | 0 684 565 A1 | 11/1995 |

(Continued)

OTHER PUBLICATIONS

"EMC Documentum Architecture: Delivering the Foundations and Services for Managing Content Across the Enterprise", White Paper, Jan. 2008.*

(Continued)

*Primary Examiner* — Cindy Nguyen (74) *Attorney, Agent, or Firm* — Knobbe Martens Olson & Bear LLP (57) ABSTRACT

Provided is a content addressable storage (CAS) system that allows a user to request, either through an application server or directly to one or more CAS servers, files and content related to a query. In some embodiments, the content can be discovered by searching previously-stored metadata related to each file at the content addressable storage server. The search can also be replicated across multiple content addressable storage servers in order to obtain varied results and redundant results. Duplicate results may be flagged or omitted, and the results are returned to the requester.

23 Claims, 5 Drawing Sheets

(56) References Cited

U.S. PATENT DOCUMENTS

| | | |
|---|---|---|
| 5,319,629 A | 6/1994 | Henshaw et al. |
| 5,321,520 A | 6/1994 | Inga et al. |
| 5,321,681 A | 6/1994 | Ramsay et al. |
| 5,384,643 A | 1/1995 | Inga et al. |
| 5,410,676 A | 4/1995 | Huang et al. |
| 5,416,602 A | 5/1995 | Inga et al. |
| 5,451,763 A | 9/1995 | Pickett et al. |
| 5,469,353 A | 11/1995 | Pinsky et al. |
| 5,499,293 A | 3/1996 | Behram et al. |
| 5,513,101 A | 4/1996 | Pinsky et al. |
| 5,531,227 A | 7/1996 | Schneider |
| 5,542,768 A | 8/1996 | Rother |
| 5,544,649 A | 8/1996 | David et al. |
| 5,559,888 A | 9/1996 | Jain et al. |
| 5,572,422 A | 11/1996 | Nematbakhsh et al. |
| 5,586,262 A | 12/1996 | Komatsu et al. |
| 5,597,182 A | 1/1997 | Reber |
| 5,597,995 A | 1/1997 | Williams |
| 5,605,153 A | 2/1997 | Fujioka et al. |
| 5,655,084 A | 8/1997 | Pinsky et al. |
| 5,659,741 A | 8/1997 | Eberhardt |
| 5,668,998 A | 9/1997 | Mason et al. |
| 5,671,353 A | 9/1997 | Tian et al. |
| 5,687,717 A | 11/1997 | Halpern et al. |
| 5,721,825 A | 2/1998 | Lawson et al. |
| 5,724,582 A | 3/1998 | Pelanek et al. |
| 5,734,629 A | 3/1998 | Lee |
| 5,734,915 A | 3/1998 | Roewer |
| 5,763,862 A | 6/1998 | Jachimowicz |
| 5,796,862 A | 8/1998 | Pawlicki et al. |
| 5,809,243 A | 9/1998 | Rostoker |
| 5,819,267 A | 10/1998 | Uyama |
| 5,822,544 A | 10/1998 | Chaco et al. |
| 5,823,948 A | 10/1998 | Ross et al. |
| 5,832,488 A | 11/1998 | Eberhardt |
| 5,848,198 A | 12/1998 | Penn |
| 5,848,435 A | 12/1998 | Brant et al. |
| 5,859,628 A | 1/1999 | Ross et al. |
| 5,867,795 A | 2/1999 | Novis et al. |
| 5,867,821 A | 2/1999 | Ballantyne et al. |
| 5,869,163 A | 2/1999 | Smith et al. |
| 5,873,824 A | 2/1999 | Doi et al. |
| 5,882,555 A | 3/1999 | Rohde et al. |
| 5,884,271 A | 3/1999 | Pitroda |
| 5,899,998 A | 5/1999 | McGauley et al. |
| 5,909,551 A | 6/1999 | Tahara et al. |
| 5,911,687 A | 6/1999 | Sato et al. |
| 5,914,918 A | 6/1999 | Lee et al. |
| 5,924,074 A | 7/1999 | Evans |
| 5,942,165 A | 8/1999 | Sabatini |
| 5,946,276 A | 8/1999 | Ridges |
| 5,949,491 A | 9/1999 | Callahan et al. |
| 5,950,207 A | 9/1999 | Mortimore |
| 5,982,736 A | 11/1999 | Pierson |
| 5,995,077 A | 11/1999 | Wilcox |
| 5,995,345 A | 11/1999 | Overbo |
| 5,995,965 A | 11/1999 | Experton |
| 6,006,191 A | 12/1999 | DiRienzo |
| 6,014,629 A | 1/2000 | Debruin-Ashton |
| 6,021,404 A | 2/2000 | Moukheibir |
| 6,022,315 A | 2/2000 | Iliff |
| 6,032,120 A | 2/2000 | Rock et al. |
| 6,035,280 A | 3/2000 | Christensen |
| 6,041,703 A | 3/2000 | Salisbury et al. |
| 6,063,030 A | 5/2000 | Vara et al. |
| 6,067,075 A | 5/2000 | Pelanek |
| 6,131,090 A | 10/2000 | Basso, Jr. et al. |
| 6,148,331 A | 11/2000 | Parry |
| 6,149,440 A | 11/2000 | Clark et al. |
| 6,155,409 A | 12/2000 | Hettinger |
| 6,157,914 A | 12/2000 | Seto et al. |
| 6,241,668 B1 | 6/2001 | Herzog |
| 6,260,021 B1 | 7/2001 | Wong |
| 6,272,470 B1 | 8/2001 | Teshima |
| 6,278,999 B1 | 8/2001 | Knapp |
| 6,283,761 B1 | 9/2001 | Joao |
| 6,363,392 B1 | 3/2002 | Halstead et al. |
| 6,397,224 B1 | 5/2002 | Zubeldia et al. |
| 6,415,295 B1 | 7/2002 | Feinberg |
| 6,421,650 B1 | 7/2002 | Goetz |
| 6,424,996 B1 | 7/2002 | Killcommons et al. |
| 6,454,705 B1 | 9/2002 | Cosentino et al. |
| 6,564,256 B1 | 5/2003 | Tanaka |
| 6,574,742 B1 | 6/2003 | Jamroga et al. |
| 6,584,502 B1 | 6/2003 | Natarajan et al. |
| 6,591,242 B1 | 7/2003 | Karp |
| 6,633,674 B1 | 10/2003 | Barnes et al. |
| 6,654,724 B1 | 11/2003 | Rubin et al. |
| 6,671,714 B1 | 12/2003 | Weyer et al. |
| 6,675,271 B1 | 1/2004 | Xu et al. |
| 6,678,703 B2 | 1/2004 | Rothschild et al. |
| 6,769,024 B1 | 7/2004 | Natarajan et al. |
| 6,934,698 B2 | 8/2005 | Judd |
| 6,954,767 B1 | 10/2005 | Kanada |
| 6,954,802 B2 | 10/2005 | Sutherland et al. |
| 6,973,034 B1 | 12/2005 | Natarajan et al. |
| 6,976,165 B1 | 12/2005 | Carpentier et al. |
| 7,039,628 B2 | 5/2006 | Logan, Jr. |
| 7,162,571 B2 | 1/2007 | Kilian et al. |
| 7,174,362 B1 | 2/2007 | Lee |
| 7,213,022 B2 | 5/2007 | Whelan et al. |
| 7,240,150 B1 | 7/2007 | Todd et al. |
| 7,266,556 B1 | 9/2007 | Coates |
| 7,283,857 B1 | 10/2007 | Fallon et al. |
| 7,298,836 B2 | 11/2007 | Wellons |
| 7,366,836 B1 | 4/2008 | Todd et al. |
| 7,379,605 B1 | 5/2008 | Ticsa |
| 7,395,215 B2 | 7/2008 | Grushka |
| 7,398,391 B2 | 7/2008 | Carpentier et al. |
| 7,415,731 B2 | 8/2008 | Carpentier et al. |
| 7,428,611 B1 | 9/2008 | Todd et al. |
| 7,434,057 B2 | 10/2008 | Yagawa |
| 7,475,432 B2 | 1/2009 | Carpentier et al. |
| 7,487,551 B2 | 2/2009 | Carpentier et al. |
| 7,523,489 B2 | 4/2009 | Bossemeyer |
| 7,530,115 B2 | 5/2009 | Carpentier et al. |
| 7,539,813 B1 * | 5/2009 | Todd et al. ............ 711/108 |
| 7,546,486 B2 | 6/2009 | Slik et al. |
| 7,552,340 B2 | 6/2009 | Ooi et al. |
| 7,552,356 B1 | 6/2009 | Waterhouse et al. |
| 7,590,672 B2 | 9/2009 | Slik et al. |
| 7,591,022 B2 | 9/2009 | Carpentier et al. |
| 7,593,720 B2 | 9/2009 | Moon et al. |
| 7,621,445 B2 | 11/2009 | Esseiva et al. |
| 7,640,271 B2 | 12/2009 | Logan, Jr. |
| 7,657,581 B2 | 2/2010 | Orenstein et al. |
| 7,694,331 B2 | 4/2010 | Vesikivi et al. |
| 7,734,603 B1 | 6/2010 | McManis et al. |
| 7,783,608 B2 | 8/2010 | Shitomi |
| 7,797,546 B2 | 9/2010 | Kenson |
| 7,802,087 B2 | 9/2010 | Gatto et al. |
| 7,836,493 B2 | 11/2010 | Xia et al. |
| 7,865,735 B2 | 1/2011 | Yiachos |
| 7,974,924 B2 | 7/2011 | Holla et al. |
| 8,036,513 B2 | 10/2011 | Oashi et al. |
| 8,045,214 B2 | 10/2011 | Samari |
| 8,059,304 B2 | 11/2011 | Samari |
| 8,233,777 B2 | 7/2012 | Seo |
| 8,266,192 B2 | 9/2012 | Nemoto et al. |
| 8,281,391 B2 | 10/2012 | Yamada et al. |
| 8,353,012 B2 | 1/2013 | Del Real |
| 2001/0027402 A1 | 10/2001 | Ramsaroop |
| 2001/0041991 A1 | 11/2001 | Segal et al. |
| 2001/0056359 A1 | 12/2001 | Abreu |
| 2002/0010679 A1 | 1/2002 | Felsher |
| 2002/0019751 A1 | 2/2002 | Rothschild et al. |
| 2002/0046061 A1 | 4/2002 | Wright et al. |
| 2002/0077861 A1 | 6/2002 | Hogan |
| 2002/0083030 A1 | 6/2002 | Yang et al. |
| 2002/0085476 A1 | 7/2002 | Samari-Kermani |
| 2002/0103675 A1 | 8/2002 | Vanelli |
| 2002/0103811 A1 | 8/2002 | Fankhauser et al. |
| 2002/0133373 A1 | 9/2002 | Silva-Craig et al. |
| 2002/0138524 A1 | 9/2002 | Ingle et al. |

(56) References Cited

U.S. PATENT DOCUMENTS

| | | |
|---|---|---|
| 2003/0004760 A1 | 1/2003 | Schiff et al. |
| 2003/0005464 A1 | 1/2003 | Gropper et al. |
| 2003/0040940 A1 | 2/2003 | Nehammer |
| 2003/0041155 A1 | 2/2003 | Nelson et al. |
| 2003/0105393 A1 | 6/2003 | Sutherland et al. |
| 2003/0200226 A1 | 10/2003 | Wells et al. |
| 2003/0208382 A1 | 11/2003 | Westfall |
| 2003/0220822 A1 | 11/2003 | Fiala et al. |
| 2004/0006492 A1 | 1/2004 | Watanabe |
| 2004/0078236 A1 | 4/2004 | Stoodley et al. |
| 2004/0083123 A1 | 4/2004 | Kim et al. |
| 2004/0107210 A1 | 6/2004 | Yang et al. |
| 2004/0146272 A1 | 7/2004 | Kessel et al. |
| 2004/0148611 A1 | 7/2004 | Manion et al. |
| 2004/0187012 A1 | 9/2004 | Kohiyama et al. |
| 2004/0187027 A1 | 9/2004 | Chan |
| 2004/0199762 A1 | 10/2004 | Carlson et al. |
| 2004/0210458 A1 | 10/2004 | Evans et al. |
| 2005/0052284 A1 | 3/2005 | Schmidtberg et al. |
| 2005/0075909 A1 | 4/2005 | Flagstad |
| 2005/0086082 A1 | 4/2005 | Braunstein et al. |
| 2005/0125252 A1 | 6/2005 | Schoenberg et al. |
| 2005/0125254 A1 | 6/2005 | Schoenberg |
| 2005/0125258 A1 | 6/2005 | Yellin et al. |
| 2005/0144172 A1 | 6/2005 | Kilian et al. |
| 2005/0192837 A1 | 9/2005 | Fears et al. |
| 2005/0197859 A1 | 9/2005 | Wilson et al. |
| 2005/0240445 A1 | 10/2005 | Sutherland et al. |
| 2005/0267863 A1 | 12/2005 | Carpentier et al. |
| 2006/0064328 A1 | 3/2006 | Datta et al. |
| 2006/0080307 A1 | 4/2006 | Carpentier et al. |
| 2006/0085226 A1 | 4/2006 | Kamber |
| 2006/0155584 A1 | 7/2006 | Aggarwal |
| 2006/0155680 A1 | 7/2006 | Wu |
| 2006/0164930 A1 | 7/2006 | Seo et al. |
| 2006/0179112 A1 | 8/2006 | Weyer et al. |
| 2006/0242144 A1 | 10/2006 | Esham et al. |
| 2007/0027715 A1 | 2/2007 | Gropper |
| 2007/0061170 A1 | 3/2007 | Lorsch |
| 2007/0073776 A1 | 3/2007 | Kalalian et al. |
| 2007/0078856 A1 | 4/2007 | Dettinger et al. |
| 2007/0180509 A1 | 8/2007 | Swartz et al. |
| 2008/0005030 A1 | 1/2008 | Schlarb et al. |
| 2008/0013365 A1 | 1/2008 | Yueh |
| 2008/0031601 A1 | 2/2008 | Hashimoto et al. |
| 2008/0065718 A1* | 3/2008 | Todd et al. .................... 709/203 |
| 2008/0071577 A1 | 3/2008 | Highley |
| 2008/0104099 A1 | 5/2008 | Walczak et al. |
| 2008/0109250 A1 | 5/2008 | Walker et al. |
| 2008/0126729 A1 | 5/2008 | Cai et al. |
| 2008/0183504 A1 | 7/2008 | Highley |
| 2008/0183719 A1* | 7/2008 | Kageyama et al. ............. 707/10 |
| 2008/0208919 A1 | 8/2008 | Dalfo et al. |
| 2008/0222654 A1 | 9/2008 | Xu et al. |
| 2008/0235759 A1 | 9/2008 | McCarty |
| 2008/0244038 A1 | 10/2008 | Martinez |
| 2008/0244196 A1 | 10/2008 | Shitomi et al. |
| 2008/0274687 A1 | 11/2008 | Roberts et al. |
| 2008/0285759 A1 | 11/2008 | Shaw |
| 2008/0306872 A1 | 12/2008 | Felsher |
| 2008/0313236 A1 | 12/2008 | Vijayakumar et al. |
| 2008/0319798 A1 | 12/2008 | Kelley |
| 2008/0319952 A1 | 12/2008 | Carpenter et al. |
| 2009/0043828 A1 | 2/2009 | Shitomi |
| 2009/0055924 A1 | 2/2009 | Trotter |
| 2009/0070834 A1 | 3/2009 | Limbasia |
| 2009/0089335 A1 | 4/2009 | Shitomi et al. |
| 2009/0119764 A1 | 5/2009 | Applewhite et al. |
| 2009/0132775 A1 | 5/2009 | Otani et al. |
| 2009/0133013 A1 | 5/2009 | Criddle et al. |
| 2009/0157987 A1* | 6/2009 | Barley et al. .................. 711/154 |
| 2009/0198515 A1 | 8/2009 | Sawhney |
| 2009/0204433 A1 | 8/2009 | Darian et al. |
| 2009/0219411 A1 | 9/2009 | Marman et al. |
| 2009/0228520 A1 | 9/2009 | Yahata et al. |
| 2009/0240764 A1 | 9/2009 | Peleg et al. |
| 2009/0252480 A1 | 10/2009 | Wright |
| 2009/0319736 A1 | 12/2009 | Otani et al. |
| 2010/0046747 A1 | 2/2010 | Oashi et al. |
| 2010/0061702 A1 | 3/2010 | Tanaka et al. |
| 2010/0088150 A1 | 4/2010 | Mazhar et al. |
| 2010/0138446 A1 | 6/2010 | Canessa et al. |
| 2010/0174750 A1 | 7/2010 | Donovan et al. |
| 2010/0185502 A1 | 7/2010 | Roberts et al. |
| 2010/0268764 A1 | 10/2010 | Wee et al. |
| 2010/0286997 A1 | 11/2010 | Srinivasan |
| 2011/0004588 A1 | 1/2011 | Leitersdorf et al. |
| 2011/0078145 A1 | 3/2011 | Chung et al. |
| 2011/0112850 A1 | 5/2011 | Bereja et al. |
| 2011/0231837 A1 | 9/2011 | Sheehan et al. |
| 2011/0246307 A1 | 10/2011 | Zinkevich |
| 2012/0151436 A1 | 6/2012 | Ahadian et al. |
| 2013/0129306 A1 | 5/2013 | Pizzuto et al. |

FOREIGN PATENT DOCUMENTS

| | | |
|---|---|---|
| EP | 0684565 | 11/1995 |
| EP | 0781032 | 6/1997 |
| EP | 0 781 032 A3 | 3/1999 |
| EP | 0 952 726 A1 | 10/1999 |
| EP | 0952726 | 10/1999 |
| GB | 2096440 | 10/1982 |
| WO | WO 97/22297 | 6/1997 |
| WO | WO 00/02202 | 1/2000 |
| WO | WO 00/19416 | 4/2000 |
| WO | WO 2007/138603 | 12/2007 |

OTHER PUBLICATIONS

International Search Report and Written Opinion of the International Searching Authority for PCT/US/09/61890 dated Dec. 10, 2009.

European Response to the Communication Pursuant to Rule 161(1) and 162 EPC, dated May 13, 2011.

Menezes A et al.: "Handbook of Applied Cryptography, Key Management Techniques" Handbook of Applied Cryptography, Jan. 1, 1996, pp. 543-590.

International Serach Report and Written Opinion issued in PCT/US2009/054799, dated Nov. 16, 2009.

International Search Report and Written Opinion issued in PCT/US2011/033647, dated Nov. 28, 2011.

International Search Report and Written Opinion issued in PCT/US2011/063987, dated Sep. 6, 2012.

Fintan J McEvoy et al.: "Security of Patient and Study Data Associated with DICOM Images when Transferred Using Compact Disc Media" Journal of Digital Imaging; The Journal of the Society for Computer Applications in Radiology, vol. 22, No. 1, Aug. 22, 2007 (pp. 65-70).

Medical Imaging Magazine, Jan. 2000. Product Showcase, Automated Dicom Exchange Station. 1 page.

Terry May Titled "Medical Information Security: the Evolving Challenge" copyright 1998 IEEE doc #0-7803-4535-5/98 pp. 85-92.

Ted Cooper Titled "Kaiser Permanente Anticipates High Cost as it Gears up for HIPAA" IT Health Care Strategist vol. 1, No. 10, Oct. 1999, p. 4.

Haufe G. et al.: PACS at Work: A Multimedia E-Mail Tool for the Integration of Voices and Dynamic Annotation. Computer Assisted Radiology, Proceedings of the International Symposium, 1998 Etsevier Science B.V., pp. 417-420.

Dimitroff D.C. et al: "An Object Oriented Approach to Automating Patient Medical Records" Proceedings of the International Computer Software and Applications Conference, (Compsac), US, Washington, IEEE. Comp. Soc. Press, vol. Conf. 14, 1990, pp. 82-87.

Kleinholz L et al.: "Multimedia and PACS. Setting the Platform for Improved and New Medical Services in Hospitals and Regions" Car '96 Computer Assisted Radiology. Proceedings of the International Symposium on Computer and Communication Systems for Image Guided Diagnosis and Therapy, Paris, France, Jun. 1996, pp. 313-322, XP002083080 1996, Amsterdam, Netherlands, Elsevier, Netherlands, ISBN: 0-444-82497-9.

(56) References Cited

OTHER PUBLICATIONS

1996 Annual HIMSS Conference and Exhibition, Managing Care: The Race Is On, dated Mar. 3-7, 1996.
FilmX Presentation Slides.
Candelis website excerpt, http://www.candelis.com.via.the.internet. Wayback.Machine (Archibe org), Jul. 19, 2010.
Carestream website excerpt, http://carestream.com via the Internet Wayback Machine (Archive.org), Nov. 20, 2010.
eMix website excerpt, http://www.emix.com via the Internet Wayback Machine (Archive.org), Jul. 10, 2011.
GE Healthcare IT website excerpt, http://www.dynamic-imaging.com via the Internet Wayback Machine (Archive.org), Jan. 27, 2010.
HeartIT website excerpt, http://heartit.com via the Internet Wayback Machine (Archive.org), Jan. 29, 2009.
Infinitt North American website excerpt, http://infinittna.com via the Internet Wayback Machine (Archive.org), Feb. 28, 2009.
InSite One website excerpt, http://www.insiteone.com via the Internet Wayback Machine (Archive.org), Aug. 8, 2010.
LifeiMAGE website excerpt, http://www.lifeimage.com via the Internet Wayback Machine (Archive.org), Nov. 4, 2010.
McKesson website excerpt, http://www.mckesson.com via the Internet Wayback Machine (Archive.org), Oct. 20, 2010.
MyMedicalRecords.com website excerpt, http://www.mymedicalrecords.com via the Internet Wayback Machine (Archive.org), Aug. 1, 2010.
PACS Image website excerpt, http://www.pacsimage.com via the Internet Wayback Machine (Archive.org), Apr. 2, 2010.
Solmage website excerpt, http://www.soimage.com via the Internet Wayback Machine (Archive.org), Sep. 27, 2010.
See My Radiology website excerpt, http://www.seemyradiology.com via the Internet Wayback Machine (Archive.org), Jul. 11, 2010.
Symantec Health Press Release, http://www.symantec.com/about/news/release/article.jsp?prid=20100819_01, Aug. 19, 2010.
XRAYLINE website excerpt, http://www.xrayline.com via the Internet Wayback Machine (Archive.org), Oct. 13, 2010.
Bitcache, drupal.org. 2 pages.
Ferelli, Mark, Content-addressable storage—Storage as I See it, Computer Technology Review, http://findarticles.com/p/articles/mi_m0BRZ/is_10_22/ai_98977101/, Oct. 2002, in 2 pages.
HoneyComb Fixed Content Storage, Solaris, http://hub.opensolaris.org/bin/view/Project+honeycomb/Webhome, Oct. 26, 2009 in 2 pages.
International Search Report issued in PCT/US2011/033647, dated Nov. 28, 2011.
Mellor, Chris, Making a Hash of File Content, Techworld, http://features.techworld.com/storage/235/making-a-hash-of-file-content/?, Dec. 3, 2009, in 2 pages.
Quinlan, S., et al., Venti: a new approach to archival storage, doc.cat-v.org/plan_9/4th_edition/papers/venti, in 20 pages.
Rhea, S., et al., Fast, Inexpensive Content-Addressed Storage in Foundation, http://doc.cat-v.org/plan_9/misc/foundation/, in 22 pages.
Tolia, N., et al., Opportunities Use of Content Addressable Storage for Distributed File Systems, USENIX Association, Jun. 9, 2003, in 15 pages.
Twisted Storage, http://twistedstorage.sourceforge.net/news.html, in 1 page.
Twisted Storage, http://twistedstorage.sourceforge.net/index.html, in 7 pages.
Handbook of Applied Cryptography, Key Management Techniques, Menezes et al., Handbook of Applied Cryptography, Jan. 1996.
Vepro, 17 Years Computer Experience; Company Profile; Letter re: Software Evaluation; Email re: Software Evaluation (Feb.-Mar. 1998).

\* cited by examiner

SYSTEM AND METHODS FOR METADATA MANAGEMENT IN CONTENT ADDRESSABLE STORAGE

CROSS-REFERENCE TO RELATED APPLICATIONS

This application claims priority to U.S. Provisional Patent Application No. 61/108,341, filed on Oct. 24, 2008, the entire contents of which are hereby incorporated herein for all purposes by this express reference.

BACKGROUND

1. Field

This disclosure relates to Content Addressable Storage for handling, storing, and distributing medical imaging information and, more specifically, to metadata management for CAS systems.

2. Description of the Related Art

Many files stored in computer systems represent data that is not expected to change over time. In some systems, the percentage of files that are expected to not change can range up to 90% of the total files in the system. Examples of data and files that are expected not to change include medical images, images of cancelled bank checks, images collected by oil and gas exploration, surveillance videos, television news clips, and many types of archive and historical data. This is in strong contrast to files that are expected to change regularly, such as a database file, a word processing document that is being edited, and any type of file that represents current state, such as a file holding cumulative email messages as they arrive.

Content Addressable Storage (CAS) technology can be used to store different types of data including, by way of example, data that does not change over time. Generally, a "handle" (not necessarily a file location) or a GUID (globally unique identifier) is created for each stored object. This handle can be created based on known techniques. In one embodiment, CAS stores information that can be retrieved based on its content, not its storage location.

For example, in some embodiments a CAS system comprises storage nodes, where data is physically kept, and access nodes, where information on the data's location on the storage nodes are kept. As new documents are passed to a CAS device, they are hashed, then stored based on that hash rather than with a directory table. Data is stored and retrieved with the resulting hash rather than based on a physical storage location or by using a hierarchical file system.

As content, such as an image, is received, it can be received by an application server and stored locally at the application server, or if the data meets whatever criteria are set up for CAS storage, stored in the CAS storage. Any metadata or other searchable data is stored on the application server or its local storage. The problem with current systems that utilize CAS, however, is that an end user searches for data on an application server and that application server must know about the content stored in the CAS (e.g., the specific GUID) in order to retrieve it. Metadata, even if it were embedded in or part of the content to be stored in the CAS, would not be searchable. If the application server did not itself store a particular image or other content to a CAS, then it would not know the GUID or handle of the content and would not be able to retrieve it.

These and other problems are addressed by the embodiments described herein.

SUMMARY

Embodiments of the systems, methods, and devices described herein overcome problems of the prior art by allowing a user to search for content that has been stored in content addressable storage, or CAS, even if that content was not stored by the local application server. Systems with multiple application servers, and perhaps even application servers that are of a heterogeneous nature, receive content to be stored and, if certain criteria are met, store the content in a CAS repository. In some cases, the content may be stored in more than one CAS repository and will therefore be replicated in order to provide some redundancy of the data. When storing the data to a CAS repository, the CAS server also collects and stores metadata associated with the content. The metadata can also be replicated over multiple CAS systems.

When a user later attempts to search for data, the search can be performed directly on the application server, which may then search the metadata for content that it has stored. In some embodiments, the application server may also send queries to CAS servers, which can then perform the search on the metadata associated with the CAS content stored there. The CAS content can then all be sent back to the application server, compiled (perhaps deleting or flagging duplicates of CAS content returned), and returned as a results set to the user. In other embodiments, a user can search the distributed CAS servers directly and can receive compiled results directly from the CAS servers.

In one embodiment a computer-implemented method for managing metadata in a content addressable storage system includes receiving a file for storage at a content addressable storage server, the file comprises a header and data, and wherein the content addressable storage server stores and retrieves the data based on content of the data rather than with a hierarchical file system; automatically obtaining with one or more computer processors metadata associated with the data from the header of the file; storing the metadata in a metadata storage device, wherein the metadata is stored in association with the data stored in the content addressable storage server; receiving a query from a requester for content at the content addressable storage server; searching the metadata storage device for content related to the received query; and when the metadata associated with the file is indicated by the query retrieving the file stored in the content addressable storage; and sending the retrieved file to the requester.

In another embodiment, a computer-implemented method for managing metadata in a content addressable storage system, includes: receiving one or more files for storage at a content addressable storage server, wherein each of the one or more files comprises a header and data, and wherein the content addressable storage server stores and retrieves the data based on content of the data rather than with a hierarchical file system; automatically obtaining with one or more computer processors metadata associated with the data from the header of each of the one or more files; storing the metadata in a metadata storage device, wherein the metadata is stored in association with the data stored in the content addressable storage server; receiving a first query from a requester for content at an application server; searching locally at the application server for one or more files related to the first query; sending a second query, related to the first query, to the content addressable storage server; receiving one or more files related to the second query from the content addressable storage server; and sending to the requester the one or more files found locally based on the first query and the one or more files received from the content addressable storage server based on the second query.

In yet another embodiment, a computer-implemented system for managing metadata in a content addressable storage system, includes a content addressable storage system configured to: receive a file for storage, said file to be stored using content addressable storage; store metadata associated with the file in a storage mechanism for storing metadata for content addressable storage; receive a query from a requester for content; search the metadata storage mechanism for content related to the received query; and when the metadata associated with the file is indicated by the query: retrieve the file stored in the content addressable storage; and send the retrieved file to the requester.

In yet another embodiment, a computer-implemented system for managing metadata in a content addressable storage system, comprising: a content addressable storage system configured to receive a file for storage, said file to be stored using content addressable storage; and store metadata associated with the file in a storage mechanism for storing metadata for content addressable storage; and an application server configured to: receive a first query from a requester for content; search locally for content related to the first query; send a second query, related to the first query, to the content addressable storage system; receive one or more files related to the second query from the content addressable storage system; and send to the requester the one or more files found locally based on the first query and the one or more files received from the content addressable storage system based on the second query.

These and other features and advantages of the invention will become apparent from the following description of embodiments. Neither this summary nor the following detailed description purports to define the invention. The invention is defined only by the claims.

BRIEF DESCRIPTION OF THE DRAWINGS

These and other features will now be described with reference to the drawings summarized below. These drawings and the associated description are provided to illustrate specific embodiments, and not to limit the scope of the invention.

DETAILED DESCRIPTION

In the following detailed description, references are made to the accompanying drawings that illustrate specific embodiments in which the invention may be practiced. Electrical, mechanical, programmatic and structural changes may be made to the embodiments without departing from the spirit and scope of the disclosure. The following detailed description is, therefore, not to be taken in a limiting sense and the scope of the disclosure is defined by the appended claims and their equivalents.

Figure 1:
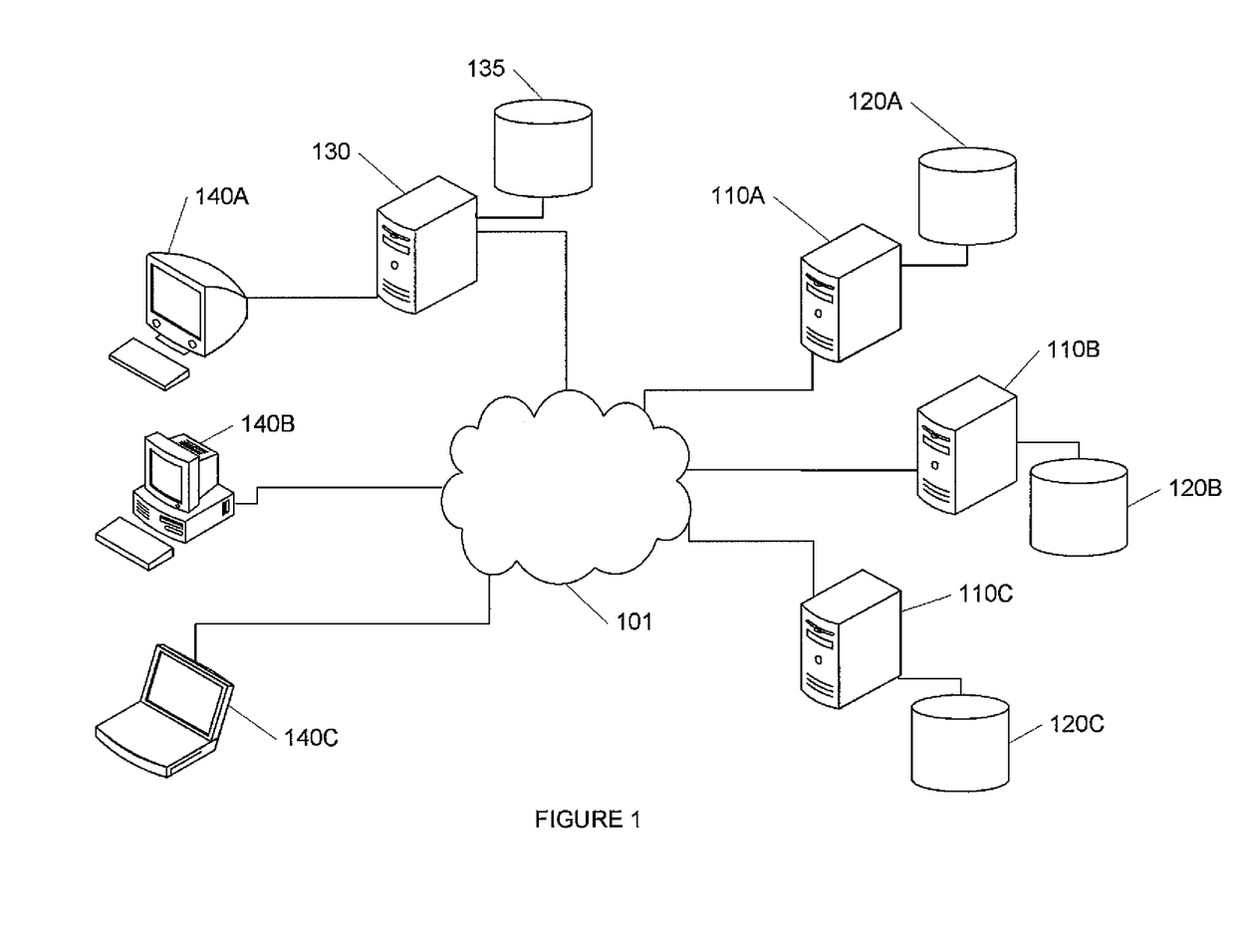
FIG. 1 illustrates a block diagram of a system for metadata management in a content addressable storage system.

FIG. 1 illustrates a block diagram of a system for metadata management in a content addressable storage system. In FIG. 1, numerous computers and systems are all interconnected via a network 101. The network 101 may be the internet, an intranet, a dedicated wired network, one or more cables, a wireless network, or any other appropriate type of communication. The system may include one or more CAS servers 110A-C. Each of these CAS servers may include or have thereto attached one or more storage systems 120A-C. The storage systems 120A-C may include one or more RAID storage systems, cloud storage, tape storage, optical disks, magnetic disks, and/or any other appropriate type of storage. There may be any number of CAS servers and each may have any number of storage systems 120A-C. Two or more storage systems 120A-C may reside on the same physical disk or storage, or each storage system 120A-C may reside on one or more disks or other storage separate from all of the other storage systems 120A-C. In some embodiments, content stored in a CAS server 101A-C may be retrieved based on a GUID, as is known in the art, or based on a search, as discussed herein.

As noted herein, when a CAS server 110A-C receives content to store, it may store the content and metadata to the storage system 120A-C. The content may be stored in the format in which it is received, or in flat files, directories, databases, or the like. The metadata may be stored in any fashion, including in a database, flat file, directory of files, or the like. In some embodiments, the metadata may be stored in XML or other structured file as plain text and this plain text may be searchable. In some embodiments, the metadata is stored in a database, and this database may be searchable.

The CAS servers 110A-C may be coupled via the network to one or more application servers 130. The application server 130 may include or have thereto attached a storage system 150. The storage system 130, like the storage system 120A-C, may include one or more one or more RAID storage systems, cloud storage, tape storage, optical disks, magnetic disks, and/or any other appropriate type of storage. In some embodiments, the application server 130 is used to receive one or more files, make a decision to store the file in CAS and to send the file and or metadata to a CAS server 110A-C in order to store the CAS content and/or the metadata. In some embodiments, the application server 130 may be used by a user using a client computer, e.g., client system 140A, in order to query for content. The user may submit a query for content to the application server 130 and the application server may attempt to respond to that query both by looking locally, including on its storage system 135 and by sending the query to one or more CAS servers 110A-110C.

In some embodiments, one or more client systems 140B-140C are coupled to the network 101 and may allow a user to query the CAS servers 110A-110C via a client application directly without going through an application server 130.

Storing the CAS Content and Metadata

Figure 2:
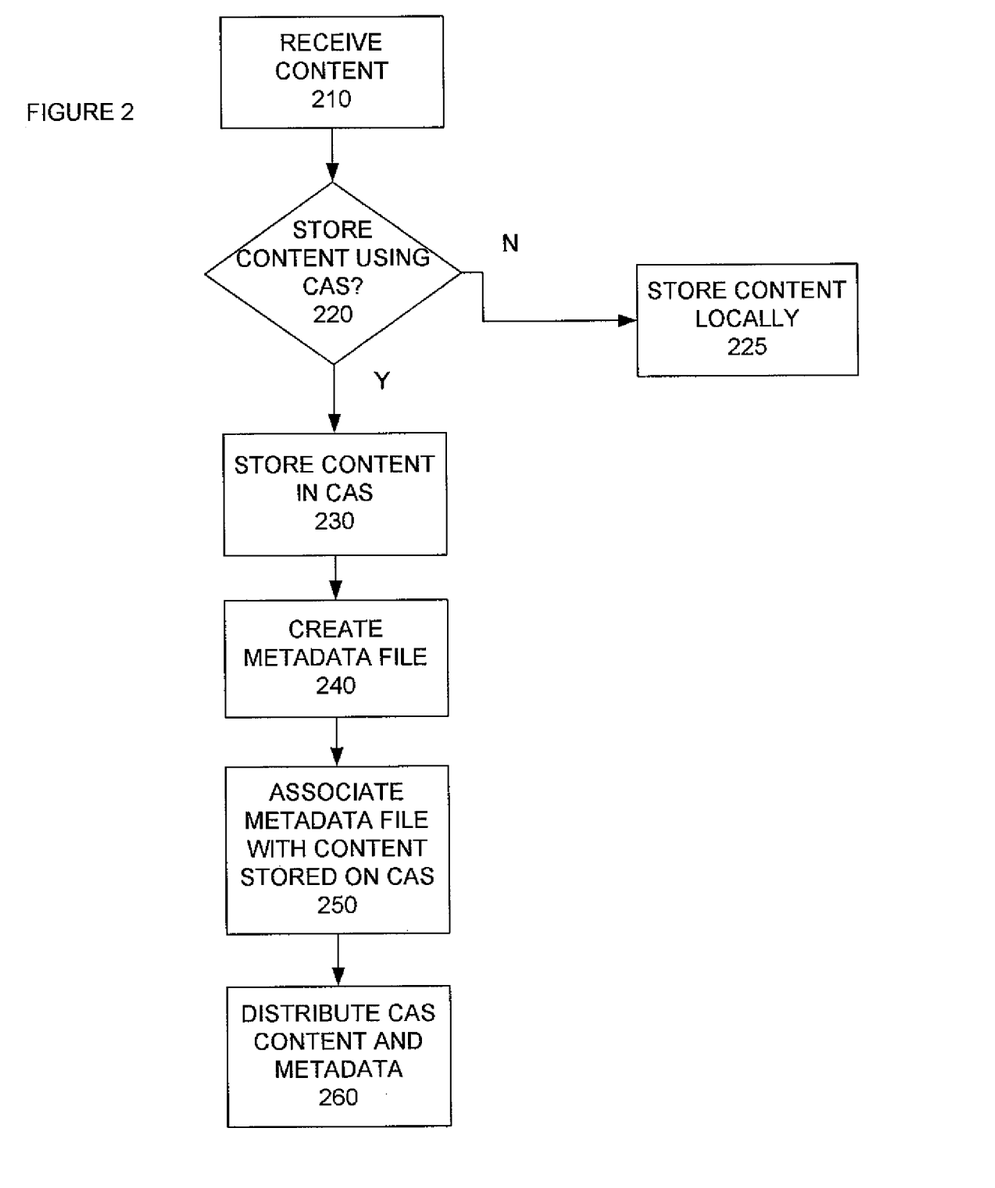
FIG. 2 is a block diagram representing an exemplary process for storing metadata in one or more CAS servers.

FIG. 2 is a block diagram representing an exemplary process for storing metadata in one or more CAS servers. In step 210, content is received. In some embodiments, receiving content may include receiving DICOM images, images, historical data, video or other content. The content may be received, e.g., at an application server 130.

Content Addressed Storage (CAS) is a technique by which a unit of data stored on a storage system is accessed using an address that is derived from the content of the unit of data. As an example, the unit of data may be provided as an input to a hashing function which generates a hash value that is used as the content address for the unit of data. When a host computer sends a request to a content addressable storage system to retrieve a unit of data, the host provides the content address (e.g., hash value) of the unit of data. The storage system then determines, based on the content address, the physical location of the unit of data in the storage system, retrieves the unit of data from that location, and returns the unit of data to the host computer.

If, in step 220, a determination is made to not store the content in CAS, then the application server 130 may store the content locally in a storage system 135. The application server may also store metadata associated with the content locally on the application server 130 or in the storage system 135. Further, the content and the metadata may be correlated. For example, the metadata may be stored in a database or an XML file and may include a pointer or reference to the content (such as a file location or unique database ID depending on the implementation and the type of data). The locally-stored metadata may later be searched and the content and metadata served to a searcher. Methods for choosing what data to store in CAS storage and what content to not store in CAS may include data types (e.g., PDF files, images, and medical records may be indicated as CAS candidates) last modification date, identity of the providing system, indications in the metadata, compliance with Sarbanes-Oxley, age of the file, status of a project related to the file, size of the file, or ways known to those skilled in the art.

If, in step 220, a determination is made to store the content at a CAS server 110A-C, then the content is sent to a CAS server in step 230, a metadata file is created in step 240, and the content and metadata are associated with each other in step 250. In the depicted embodiment of the process, the application server may send the content to the CAS server in step 230 and the CAS server may create the metadata file in step 240. In other embodiments, the metadata file is created at the application server and both are sent to the CAS server. Similarly, the metadata file may be associated with the content file (step 250) either at the application server or at the CAS server. In some embodiments, the application server may send the content and/or the metadata to more than one server.

The metadata corresponding to the CAS content may include any relevant data such as author, data owner, patient name (in the case of medical data), patient number, television episode title, creation date, etc. The metadata may be stored in a number of ways. For example, the data may be stored in an XML file, in an unformatted text file, in a formatted text file, in a database entry, or in any other of a myriad of appropriate manners. The metadata may come from a DICOM header, text in the file, analysis of the file (e.g., size and modification date of the file), summary or metadata fields in the document, descriptive or other files associated with received file, or other sources of metadata. This stored metadata may then later be searchable. Associating the metadata with the content in step 250 may comprise including the GUID for the content in the metadata file or having a separate file, database entry, etc. that includes references to the metadata and the content.

In the depicted embodiments, in step 260, the CAS content and metadata may be distributed to multiple CAS servers. The CAS content and metadata may be distributed to multiple servers simultaneously or sequentially, in a hierarchical fashion where each CAS server distributes the data to one or more other CAS servers, or in any other appropriate manner or topology. In other embodiments, as noted herein, the CAS content and metadata may not be distributed among CAS servers and step 260 may not be performed. In some embodiments, distributing the CAS content and the metadata can provide for redundancy benefits and/or communication benefits (given that, as the result of distribution, the CAS content may be replicated at a location that is close on the network).

Replicating Content and Metadata

Figure 3:
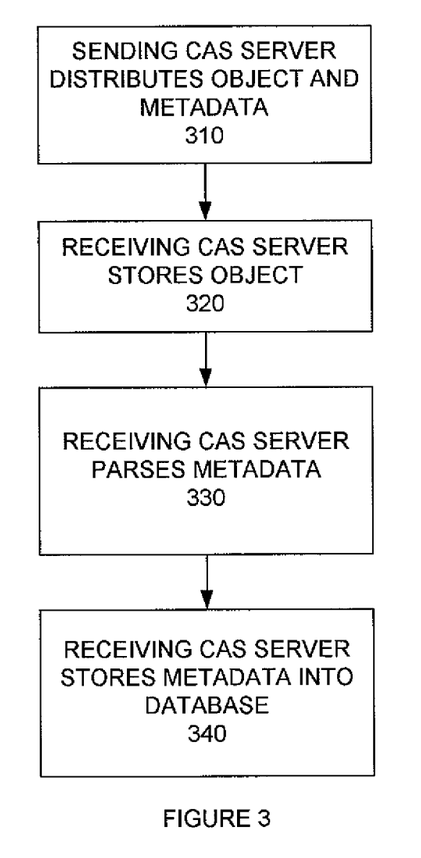
FIG. 3 is a block diagram of an exemplary process for replicating objects and metadata.

In some embodiments, a CAS server may be configured to replicate CAS objects. It may be useful to distribute the CAS content across multiple CAS servers for redundancy or other reasons. Depending on embodiment and other factors, a CAS server may replicate objects once it receives them, after a particular request for replications, during some preconfigured interval, or for any other appropriate reason. FIG. 3 is a block diagram of an exemplary process for replicating objects and metadata.

In step 310, a CAS server that has content to be replicated sends that content and the associated metadata to another CAS server. This can be accomplished, for example, using network 101. The metadata may be embedded within, appended to, or separate from the content.

In step 320, the content and metadata are received by the receiving CAS server and, in step 330, are parsed. After the data has been parsed, it is stored into a database in step 340. How the metadata is parsed will depend on the embodiment and how the data is formatted. For example, if the metadata is in an XML file, then the XML file may be parsed based on the known format of the file and stored, in step 340, into the metadata database.

In some embodiments, the metadata database may include separate fields for each of known element of metadata. For example, for a DICOM image, there are numerous known fields in the header, including patient name. The database that houses the metadata may have fields for these known elements of metadata. In some embodiments, the database may have one or more free text or other fields that will allow for storage of unknown or uncategorized metadata, such as a "notes" section of a patient chart or a "description" section of a television episode. In some embodiments, all of the database fields may later be searchable jointly or separately.

In some embodiments, the database that stores the metadata may be replicated, distributed, or otherwise available to multiple CAS servers and multiple application servers (such as those depicted in FIG. 1). Each CAS server may have its own database and the metadata for the content stored at that CAS server is stored therein. In some embodiments, a CAS server's database may also have metadata and information on finding associated CAS content for things that are stored at other CAS servers, even if that content is not also stored at that CAS server.

The metadata may also be stored, in some embodiments, in storage other than a database. For example, the metadata may be stored in a flat file, multiple flat files, or any other storage mechanism or searchable storage mechanism.

Retrieving CAS Data

Figure 4:
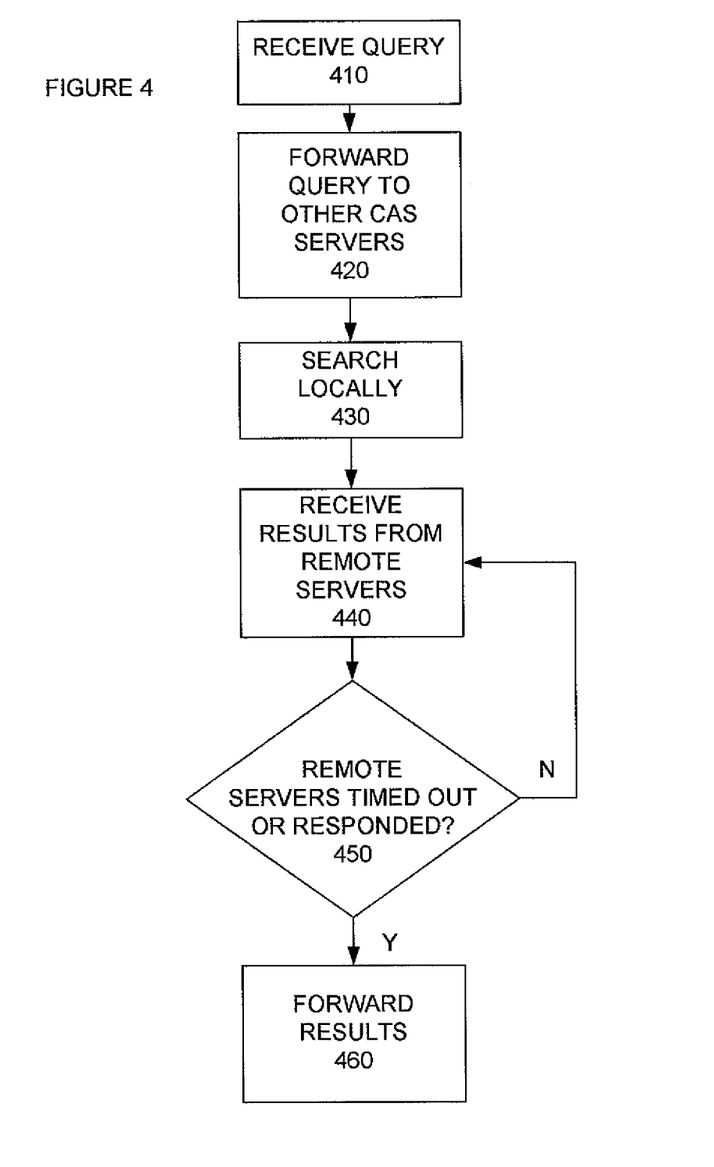
FIG. 4 depicts a block diagram of an exemplary process for retrieving CAS content from a CAS server.

Once the content is stored on the CAS servers, then, as depicted in FIG. 4, data can be retrieved from the CAS storage. FIG. 4 depicts a block diagram of an exemplary process for retrieving CAS content from a CAS server.

In step 410, a query is received, perhaps from a user using a client system 140B. The query can be in SQL, a Boolean search string, a natural language search, or any other appropriate format. In this embodiment, in step 420, the search is sent to other CAS servers. For example, as depicted in FIG. 1, after receiving a query from a user using a client system 140B, a CAS server 110B may send the query to other CAS servers 110A and 110C. In other embodiments, and perhaps based on the search request, the search might be performed only on the local metadata, looking only for locally-stored content.

In some embodiments, after the search is sent to the remote CAS servers in step 420, the search is performed locally in step 430. The local search can then be compiled and sent to the requester immediately, or, as depicted, combined with any results received from remote CAS servers and then sent to the requester in step 450. In some embodiments, the local search is performed before or simultaneously with the forwarding of the query to other CAS servers. For example, in some embodiments, a local query is first made for a file and if the query is completely satisfied, then no query is distributed to the other CAS servers.

The local query performed in step 430 can take any appropriate form and will depend on the embodiment and the format of the received query. For example, if the received query is an SQL query and the metadata is stored in a database, then the received SQL query or some modification thereof may be used to query the local data. If the received query is a Boolean search and the metadata is stored in a flat file, then a text search based on the Boolean query may be performed. Once matching metadata is found, then the associated CAS content is retrieved and made ready to send to the requester.

In steps 440 and 450, the CAS server may await results from the other CAS servers. All of the received results are combined and forwarded in step 460. For example, if a CAS server storing DICOM images requested more results for a particular patient name and patient ID, then the DICOM CAS server may send the request to multiple CAS servers in order to get any results for that patent stored on any of the other servers. The results may be checked for validity via a checksum or other assurance mechanism built into the system, or any other appropriate CAS procedures. Corrupted or otherwise invalid files may be excluded from or flagged in the CAS or in the result set sent to the requester.

Given the nature of the redundancy and distribution that may be possible with embodiments herein, multiple copies of the same CAS data may be received from multiple CAS servers. In such cases, any duplicate files may be excluded from or flagged in the result set sent to the requester. Additionally, in some embodiments, if the remote CAS server does not send a response within a particular timeout period, the CAS server may no longer await results and may send out any received results in step 450.

The results sent to the requester in step 460 can take any appropriate form, including a single compressed file, a pointed to one or more accessible pieces of data that comprise the complete data set, or any other appropriate mechanism.

Figure 5:
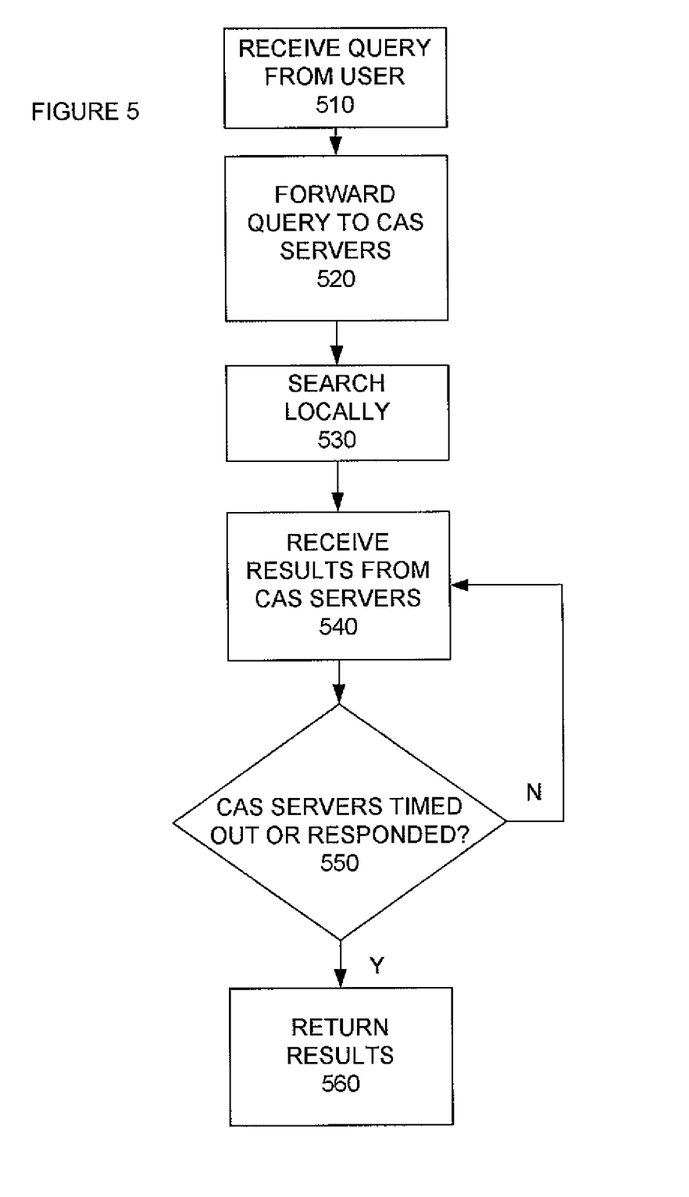
FIG. 5 depicts a block diagram of an exemplary process for retrieving CAS data via an application server.

FIG. 5 depicts a block diagram of an exemplary process for retrieving CAS data via an application server. The process depicted in FIG. 5 is similar to that depicted in FIG. 4, except that the search is initiated first by a user to an application server. The application server then sends the request to multiple CAS servers. For example, a user using a client system 140A sends a request for data to an application server 130, the application server 130 receives the request (step 510), the application server 130 forwards the request to the CAS servers 110A-C (step 520), the application server searches locally (step 530), and receives or times out waiting for results from the CAS servers (steps 540 and 550). Once all of the results are received and compiled as above, the results are sent to the client system 140A (step 560).

The local search in step 530 at the application server may be for CAS data, or it may be for other application data. For example, if the CAS servers 110A-C store DICOM images and the application server 130 stores patient demographic and billing information, then the local results may be related to the demographics and billing history of the results and the results from the CAS servers 110A-C may be DICOM images.

As above, the results from the CAS servers (and the application server if it stores replicated data) may be checked not only for integrity (via checksums, e.g.), but also for duplicates. The duplicate results may be flagged or omitted from the search results sent.

The processes and systems described herein may be performed on or encompass various types of hardware, such as computer systems. In some embodiments, the computer systems such as the client system 140A-C, the application server 130, and the content addressable storage systems 110A-C may include a bus or other communication mechanism for communicating information, and a processor coupled with the bus for processing information. The computer systems may have a main memory, such as a random access memory or other dynamic storage device, coupled to the bus. The main memory may be used to store instructions and temporary variables. The computer systems may also include a read-only memory or other static storage device coupled to the bus for storing static information and instructions. The computer systems may also be coupled to a display, such as a CRT or LCD monitor. Input devices may also be coupled to the computer system. These input devices may include a mouse, a trackball, or cursor direction keys. Each computer system may be implemented using one or more physical computers or computer systems or portions thereof. The instructions executed by the computer system may also be read in from a computer-readable medium. The computer-readable medium may be a CD, DVD, optical or magnetic disk, laserdisc, carrier wave, or any other medium that is readable by the computer system. In some embodiments, hardwired circuitry may be used in place of or in combination with software instructions executed by the processor.

As will be apparent, the features and attributes of the specific embodiments disclosed above may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and fully automated via, software code modules executed by one or more general purpose computers or processors, such as those computer systems described above. The code modules may be stored in any type of computer-readable medium or other computer storage device. Some or all of the methods may alternatively be embodied in specialized computer hardware.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing metadata in a content addressable storage system, the method comprising:
receiving, using one or more computer processors, a file for storage at a first content addressable storage (CAS) server, the file comprising a header and data, and wherein the first CAS server stores data that can be retrieved based on content of the data rather than its storage location or with a hierarchical file system;
receiving, using one or more computer processors, the same one or more files for storage at a second CAS server;
automatically obtaining, with the one or more computer processors, from the header of the file, metadata associated with the data;
storing the metadata in a first metadata storage device, wherein the metadata is stored in association with the data stored in the CAS server;
replicating the stored metadata and storing the replicated metadata in a second metadata storage device;
receiving, using the one or more computer processors, a query from a requester for content at the CAS server;
performing a local search within locally-stored content related to the received query;
sending the query to one or more CAS servers;
searching beyond a temporary data cache in a local storage device for local content not stored in the CAS server and related to the received query, wherein the local storage device and the CAS server are distinct;
sending results of the local search to the requestor;
searching the metadata storage device for content related to the received query; and
when the metadata associated with the file is indicated by the query:
retrieving the file stored in the content addressable storage; and
sending the retrieved file to the requester;
wherein sending the results of the local search and the retrieved file to the requester further comprises excluding or flagging any duplicate files.

2. The method of claim 1, wherein the CAS servers store DICOM images and the metadata is related to the DICOM images.

3. The method of claim 1, wherein the method further comprises:
distributing the file and the metadata to a plurality of CAS servers in a hierarchical fashion.

4. The method of claim 3, wherein the method further comprises:
sending the query to the plurality of CAS servers, based on the metadata;
receiving one or more files related to the query from the plurality of CAS servers; and
sending to the requester the retrieved file and the one or more files related to the query from the plurality of CAS servers.

5. The method of claim 1, wherein the metadata storage device comprises a database, XML file, flat file, or other searchable storage mechanism that associates the file stored in the CAS server with corresponding metadata to allow more efficient searching of the contents of the CAS server.

6. The method of claim 5, wherein the CAS server comprises the metadata storage device.

7. The method of claim 1, wherein the CAS server hashes the file and stores the data in the file according to the resulting hash rather than based on a physical storage location.

8. The method of claim 7, wherein the CAS system comprises fixed content storage (FCS).

9. A computer-implemented method for managing metadata in a hashed storage system, comprising:
receiving, using one or more computer processors, one or more files for storage at a first hashed storage server, wherein each of the one or more files comprises a header and data, and wherein the hashed storage server stores and retrieves the data with a hash function that generates unique identifiers linked to content of the data rather than with a location-based, hierarchical file system;
receiving, using one or more computer processors, the same one or more files for storage at a second hashed storage server;
automatically obtaining with the one or more computer processors metadata associated with the data from the header of each of the one or more files;
storing the metadata in a first metadata storage device, wherein the metadata is stored in association with the data stored in the hashed storage server;
replicating the stored metadata and storing the replicated metadata in a second metadata storage devices;
receiving, using the one or more computer processors, a first query from a requester for content at an application server, wherein the application server comprises a local storage device, the local storage device and the content addressable storage server are distinct;
after or simultaneously with the local search according to the first query, sending a second query, related to the first query, to the hashed storage server;
receiving one or more files related to the second query from the hashed storage server;
excluding or flagging any duplicate files resulting from the first query, the second query, or both, the duplicate files comprising the same one or more files; and
sending to the requester a result set comprising the one or more files found at the local storage device based on the first query and the one or more files received from the hashed storage server based on the second query, wherein any duplicate files are excluded or flagged in the result set.

10. The method of claim 9, wherein the hashed storage servers store DICOM images and the metadata is related to the DICOM images.

11. A computer-implemented system for managing metadata in a content addressable storage system comprising:
a content addressable storage system comprising at least one computer processor configured to:
receive a file for storage and backup, said file to be stored using a first content addressable storage server and also backed up to a second content addressable storage server;
store metadata associated with the file in a first storage mechanism for storing metadata for content addressable storage;
replicate the stored metadata in a second storage mechanism;
receive a query from a requester for content;
search an application server for local content that is related to the received query but that is not stored in the content addressable storage system, wherein the application server and the content addressable storage system are distinct;
retrieve the local content stored on the application server;
send the local content to the requestor;
search the metadata storage mechanism for content related to the received query; and when the metadata associated with the file is indicated by the query:
retrieve the associated file stored in the content addressable storage; and
send the retrieved file to the requester;
wherein sending the local content to the requester and sending the retrieved file to the requester comprise excluding or flagging any duplicate files.

12. The system of claim 11, wherein the computer-implemented system for managing metadata in a content addressable storage system is further configured to:
send the query to a second content addressable storage system;
receive one or more files related to the query from the second content addressable storage system; and
send to the requester the retrieved file and the one or more files related to the query from the second content addressable storage system.

13. The system of claim 11, wherein the content addressable storage system stores DICOM images having headers and the metadata is related to the headers of the DICOM images.

14. A computer-implemented system for managing metadata in a content addressable storage (CAS) system, comprising:
a CAS system comprising at least one computer processor configured to:
receive a file for storage and receive a second copy of the same file, said file and the second copy of the same file to be stored using content addressable storage; and
store metadata associated with the file and the second copy of the file in a searchable storage mechanism for storing metadata for CAS; and
an application server comprising at least one computer processor, the application server configured to:
receive a first query from a requester for content at an application server, wherein the application server comprises a local storage device and wherein the local storage device and the CAS system are distinct;
send a second query, related to the first query, to the CAS system;
receive one or more files related to the second query from the CAS system; and
send a result set to the requester, the result set comprising one or more files found locally based on the first query and the one or more files received from the CAS system based on the second query, wherein any duplicate files are excluded or flagged in the result set.

15. The system of claim 14, wherein the application server is further configured to:
send the second query to a second CAS system;
receive one or more files related to the second query from the second CAS system; and
send to the requester the one or more files received from the second CAS system based on the second query.

16. The system of claim 14, wherein the CAS system stores DICOM images and the metadata is related to the DICOM images.

17. A computer-implemented method comprising:
receiving, using one or more computer processors, a file for storage at a first fixed content storage CAS server, the file comprising a header and data;
receiving, using one or more computer processors, the same file for storage at a second CAS server;
automatically determining that the file meets the criteria for storing the file at a CAS server and storing the file at one or more CAS servers, wherein the criteria does not prevent or exclude duplicate or backup files;
automatically obtaining, with the one or more computer processors, from the header of the file, metadata associated with the file;
storing the metadata in at least one searchable metadata storage device at one or more CAS servers;
receiving, at a CAS server, using the one or more computer processors, a query from a requester for content at a CAS server;
forwarding the query, using the one or more computer processors, to at least one additional CAS server;
simultaneously with or after forwarding the query to the at least one additional CAS server, searching a local storage device for local content that is related to the query;
sending the local content to the requestor, wherein sending the local content comprises excluding or flagging any duplicate content;
searching the metadata storage device for content related to the received query; and
when the metadata associated with the file is indicated by the query:
retrieving the associated file stored in the CAS server; and
sending the retrieved file to the requester, wherein sending the retrieved file comprises excluding or flagging any duplicates.

18. The method of claim 17, wherein receiving a file for storage at a CAS server comprises storing the file using a hash function rather than a location-based directory table, the hash function configured to create an identifier uniquely and permanently linked to the content of the file itself, such that the content of the file may not change without changing the identifier.

19. The method of claim 17, additionally comprising waiting to send the retrieved file to the requester until after receiving results from forwarding the query to at least one additional CAS server, thereby allowing the results from searching the metadata storage device and searching the additional CAS server to be delivered to the requester together, and thereby allowing duplicates to be excluded or flagged in the combined results.

20. A computer-implemented system for managing fixed content storage, the system comprising:
a CAS server having at least one computer processor, the CAS server configured to:
receive files for storage and automatically recognize files as eligible for fixed content storage, wherein duplicate files are eligible for storage; and
store and retrieve files, including duplicate files, using a function that is independent of physical storage location and that maintains an identifier that is consistent for each file as long as the data comprising that file does not change;
an application server having at least one computer processor, the application server configured to:
receive files, including duplicate files, for local storage outside of the local cache, in non-temporary storage;
receive a query from a requester and convey the query to the fixed content storage server;
after or at the same time as conveying the inquiry, perform a search, based on the query, within its own local, non-temporary storage; and
retrieve any relevant local content or files and convey them to the requestor, while at the same time flagging or excluding duplicates; and a metadata storage device associated with either the FCS server or the application server, the metadata storage device configured to:

store metadata associated with the file, and any duplicate files, in a searchable metadata database;

associate metadata with files stored on the CAS server or the application server; and using these associations, allow the CAS server or the application server to search for content or files related to any received query, and when metadata associated with a file is indicated by the query, retrieve the relevant file or files, whether stored in the CAS server or in local storage and send any retrieved files to the requester, excluding or flagging duplicates.

21. The system of claim 20, wherein the metadata storage device comprises an XML file, flat file, or other searchable storage mechanism that associates the file stored in the CAS with corresponding metadata to allow more efficient searching of the contents of the CAS server.

22. The system of claim 20, wherein the CAS server is further configured to store and retrieve files using a hash function rather than a location-based directory table, the hash function configured to create an identifier uniquely and permanently linked to the content of the file itself, such that the content of the file may not change without changing the identifier.

23. The system of claim 20, wherein the application server is configured to store and retrieve data in its local storage based on a physical storage location or hierarchical file system rather than using CAS or a hashing function.

* * * * *